(12) United States Patent
Lin et al.

(10) Patent No.: US 7,206,609 B2
(45) Date of Patent: Apr. 17, 2007

(54) METHOD AND APPARATUS CAPABLE OF DETERMINING AND UTILIZING RADIO WAVE DIRECTIONAL INFORMATION

(75) Inventors: Xintain E. Lin, Mountain View, CA (US); Oinghua Li, Sunnyvale, CA (US); Allen W. Bettner, Los Gatos, CA (US)

(73) Assignee: Intel Corporation, Santa Clara, CA (US)

( * ) Notice: Subject to any disclaimer, the term of this patent is extended or adjusted under 35 U.S.C. 154(b) by 210 days.

(21) Appl. No.: 10/835,167

(22) Filed: Apr. 29, 2004

(65) Prior Publication Data

US 2005/0245286 A1 Nov. 3, 2005

(51) Int. Cl.
*H04B 1/38* (2006.01)

(52) U.S. Cl. .................. 455/562.1; 455/12.1; 455/424; 370/294; 340/10.1

(58) Field of Classification Search ............... 455/12.1, 455/562, 424, 423; 370/294, 334; 340/10.1; 342/378
See application file for complete search history.

(56) References Cited

U.S. PATENT DOCUMENTS

| 6,483,459 | B1* | 11/2002 | Hou et al. ................. 342/378 |
| 6,693,511 | B1* | 2/2004 | Seal ......................... 340/10.1 |
| 6,735,182 | B1* | 5/2004 | Nishimori et al. .......... 370/294 |
| 2001/0031649 | A1* | 10/2001 | Lindskog et al. ........... 455/562 |
| 2003/0092380 | A1* | 5/2003 | Soliman et al. ............ 455/12.1 |
| 2004/0052227 | A1* | 3/2004 | Judd et al. ................. 370/334 |

* cited by examiner

*Primary Examiner*—Joseph Feild
*Assistant Examiner*—Phuoc Doan
(74) *Attorney, Agent, or Firm*—James S. Finn

(57) ABSTRACT

Briefly, in accordance with one embodiment of the invention, an apparatus comprises a plurality of RF antennas, the plurality of RF antennas have a calibrated radiation pattern. The apparatus may further comprise a directional finding program that receives RF signal information from said plurality of RF antennas and RF antenna calibrated radiation pattern information and then calculates the direction from which said RF signals emanate relative to said apparatus.

29 Claims, 6 Drawing Sheets

METHOD AND APPARATUS CAPABLE OF DETERMINING AND UTILIZING RADIO WAVE DIRECTIONAL INFORMATION

BACKGROUND

A wireless LAN (WLAN) may include a data transmission system designed to provide location-independent network access between computing devices by using radio waves rather than a cable infrastructure. In the corporate enterprise, wireless LANs may be implemented as the final link between the existing wired network and a group of client computers, giving these users wireless access to the full resources and services of the corporate network across a building or campus setting.

One issue affecting WLAN demand has been limited throughput and reliability. The data rates supported by the original 802.11 standard may not be sufficient to support some general business requirements and have slowed adoption of WLANs. Recognizing the critical need to support higher data-transmission rates and reliability, the Institute of Electrical and Electronics Engineers (IEEE) recently ratified the 802.11b standard (also known as 802.11 High Rate) for transmissions of up to 11 Mbps. Subsequent standards, such as 802.11g may provide even greater transmission rates. However, due to the nature of the unlicensed band used by the 802.11 radios, interference caused by spurious and non spurious RF sources may degrade wireless transmission and reception and prevent widespread adoption of wireless technology. Thus, there is a continuing need for better ways to improve data rates and reliability and decrease interference in wireless environments such as a WLAN.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
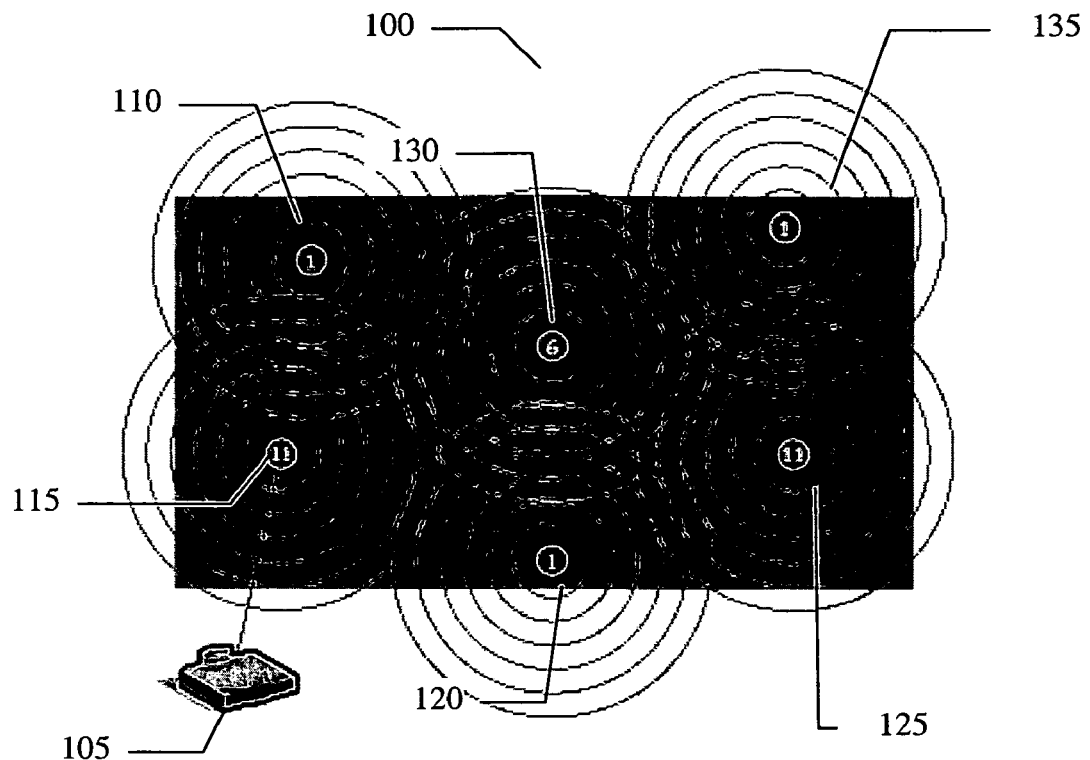
FIG. 1 illustrates the re-association process in a WLAN environment.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm or program is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system or program or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. An apparatus may be specially constructed for the desired purposes, or it may comprise a general purpose computing device selectively activated or reconfigured by a program stored in the device. Such a program may be stored on a storage medium, such as, but not limited to, any type of disk including floppy disks, optical disks, compact disc read only memories (CD-ROMs), magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein. In addition, it should be understood that operations, capabilities, and features described herein may be implemented with any combination of hardware (discrete or integrated circuits) and software.

In an embodiment of the present invention a WLAN is described. In a WLAN, the 802.11 MAC layer may be responsible for how a client associates with an access point (AP). When an 802.11 client enters the range of one or more APs, it may choose an access point to associate with (also called joining a Basic Service Set), based on signal strength and/or observed packet error rates. Once accepted by the AP, the client may tune to the radio channel to which the access point may be set. Periodically it may survey all 802.11 channels in order to assess whether a different access point would provide it with better performance characteristics. If it determines that this is the case, it may disassociate with the current AP and reassociate with the new access point, tuning to the radio channel to which that access point may be set.

As depicted in FIG. 1 at 100, wireless station 105 may be associated with either of APs 110–135. Reassociation may occur because the wireless station 105 has physically moved away from the original access point 115, causing the signal to weaken or an interfering device radiating spurious RF signals may come between the AP and wireless station. In other cases, reassociation may occur due to a change in radio characteristics in the building, or due simply to high network traffic on the original AP. In the latter case this function may be referred to by some as "load balancing," since it may function to distribute the total WLAN load efficiently across the available wireless infrastructure There may be further challenges in wireless communications due to fading and shadowing. To improve performance in 802.11 systems, multiple antennas may be used on an 802.11 receiver to improve the performance under fading environment. These antennas may typically be omni directional and more specifically in one embodiment may be 2 omni antennas or 2 directional antennas with asymmetric patterns with respect to the separation between the phase center of the 2 directional antennas. Although the scope of the present invention is not limited in this respect. However, it may be possible to exploit 4 sector antennas to improve the signal to noise ratio (SNR) by 4–6 dB, depending on the indoor and outdoor environment. With a multiple transmitter/receiver chain, multiple antennas may also be employed as well to facilitate beam forming, analog or digital, to increase data rate and/or avoid interference.

The aforementioned calibrated radiation pattern associated with each of the plurality of RF antennas may be calculated to take into account a predetermined usage model, such as a clam shell laptop computer. A wide variety of direction finding programs (program as used herein is meant to include, but not be limited to, algorithms or steps to be carried out or any sequence of instructions that a computer can interpret and execute, although it is understood a computer is not required for the present invention) may be utilized and may receive input (S_i) sequentially or in parallel. For example, the following direction finding program can be utilized in one embodiment of the present invention:

Max(abs(S_i)/max(abs(D_i(theta))), where D_i is the antenna radiation pattern.

To increase performance, D_i may include phase information. It should be understood that a large number of programs and algorithms can be utilized in the present invention and the foregoing was provided merely as a an embodiment and illustrative example. The derived direction from which the RF signals emanate relative to the apparatus may be the Angle of Arrival (AoA) information. The directional information may be utilized in a variety of ways, but may include displaying the direction from which the RF signals emanate relative to the apparatus direction on a display on a mobile device. Examples of some wireless devices can include, but are not limited to, a portable computer with a wireless network connection, wireless PDAs, personal communication system (PCS) or cellular or mobile phones. Other embodiments may include, for example, any combination of laptop and portable commuters with wireless communication capability, web tablets, wireless headsets, instant messaging devices, MP3 players, digital cameras, and other devices that may receive and/or transmit information wirelessly. Although it should be understood that the scope and application of the present invention is in no way limited to these examples.

Although the scope of the present invention is not limited in this respect, an embodiment of the present invention provides for proper arrangement of Multiple Antennas (MA) and calibration of the antenna radiation pattern and storing the information in the device. As mentioned previously, the phase delay of the antennas may be included as well. The Directional Finding Program (DFP) may take signals from the MAs in serial or parallel and combined with the calibration information calculates the radio wave directions with respect to the local device. The program may then display the directional information to the operator of the device.

An embodiment further provides displaying the direction to any spurious interfering RF emitters in the wireless environment and the characters of the device, cordless phone, monitor, Bluetooth device and microwave oven etc.

Figure 2:
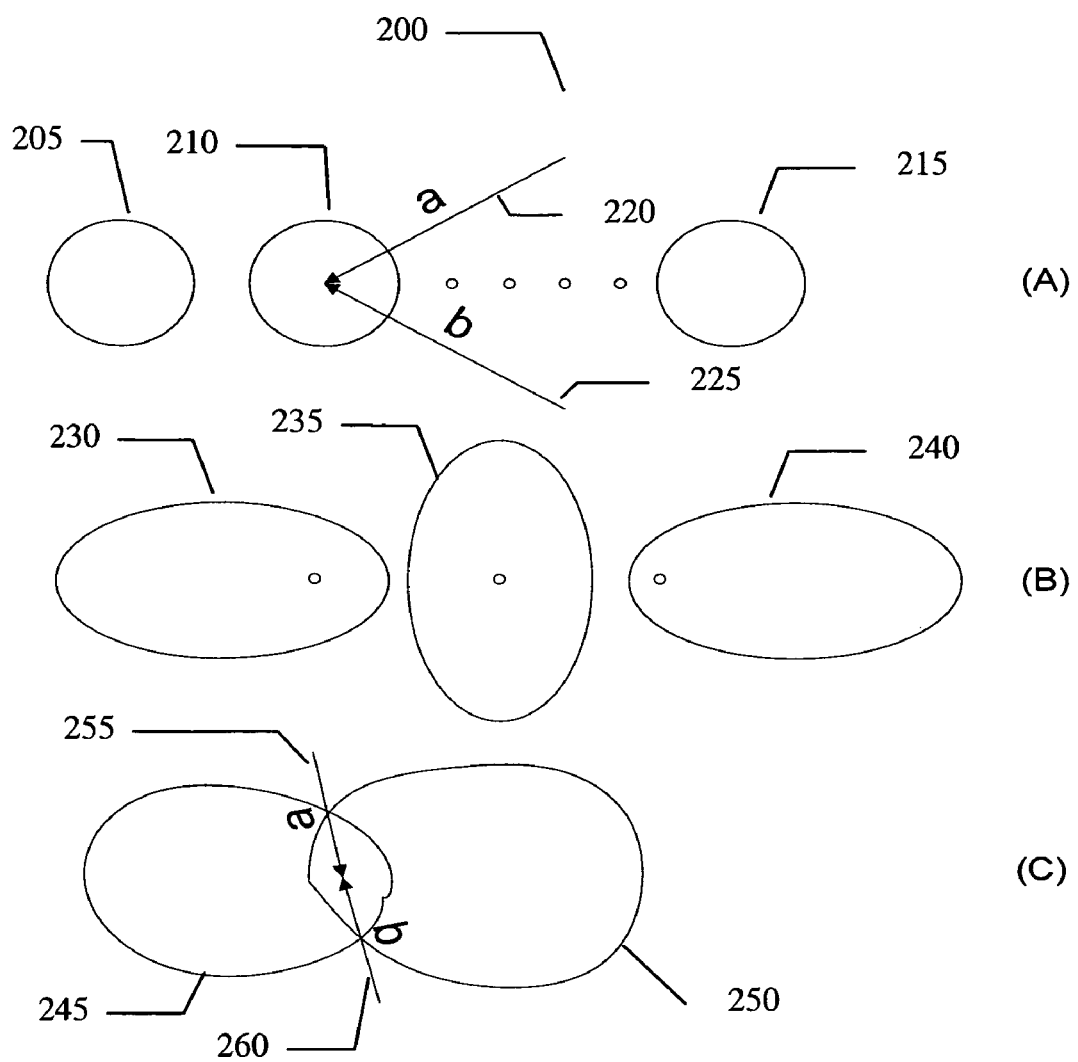
FIG. 2 is a representation of an antenna arrangement that does not yield a good directional estimate.

FIG. 2, shown generally as 200, illustrates circles 205, 210 and 215 which represent omni directional antennas. If only amplitude of the incoming signal is measured, one can not derive any information about the Angle of Arrival (AoA). Even with phase information, the result may still be ambiguous between direction a (shown at 220) and b (shown at 225).

In fact, as depicted by ellipses 230, 235 and 240 and overlapping ellipses 245 and 250 with direction a at 255 and direction b at 260, with any collinear arrangement, if the antenna pattern is symmetric about the linear axis, the same ambiguity exists.

Figure 3:
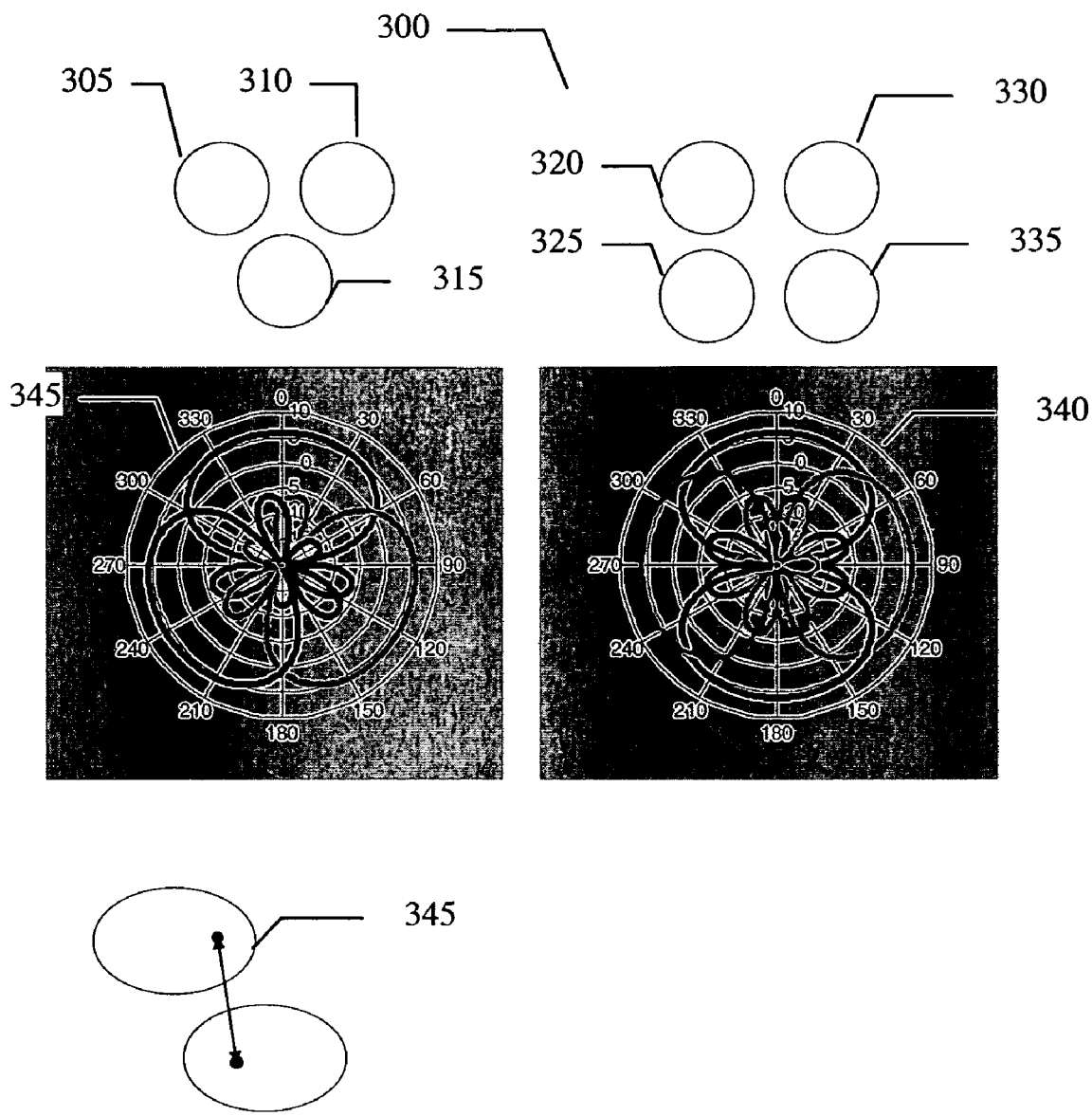
FIG. 3 is a representation of antenna arrangements according to an embodiment of the present invention.

Turning now to FIG. 3, depicted generally at 300, the antennas radiation patterns 340 and 345 may be measured and stored in the device. The measurement may take into account of the usage model. For example and as articulated above, with a clam shell laptop design, the screen is usually tilted at 120 degrees from the keyboard with the keyboard in horizontal plane. FIG. 3 illustrates a two antenna embodiment 345, a three antenna embodiment with antennas 305, 310 and 315 and a four antenna embodiment with antennas 320, 325, 330 and 335. Although the embodiments of FIG. 3 use a two, three or four antenna embodiment, numerous other possibilities exist for antenna number and placement variations. For purposes of illustrating one embodiment of the program that may be utilized, the variable $D_i(\theta)$, i=1 . . . 4, for the case of 4 directional antennas is used. The variable D may include phase information as well. Depending on the angular resolution practical or desirable, the number of theta points can be as small as 1.

Figure 4:
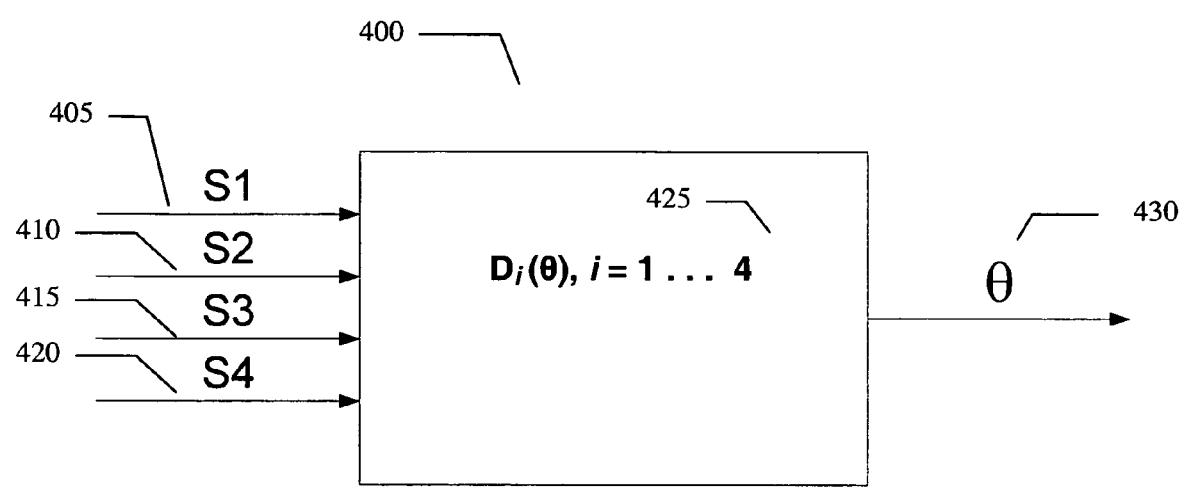
FIG. 4 illustrates the multiple RF signal inputs to the directional finding program and the output Angle of Arrival (AoA)

As shown in FIG. 4, the directional finding program may utilize the calibration information 425, where $D\_i(\theta)$ is the antenna radiation pattern at a given θ and takes the signal S_i (in this case i=1 . . . 4) measured at antenna port S1, 405, S2, 410, S3, 415, and S4, 420, and estimates the most likely AoA (i.e., θ at 530). The input S_i, i=1 . . . 4, can be sequential or parallel. As state above, the program for 4 directional antennas that point to the North, East, South or West direction could be:

$$\text{Max}(\text{abs}(S\_i)/\max(\text{abs}(D\_i(\text{theta}))), I=1 \ldots 4).$$

In this embodiment, the directional finding program may provide a direction estimate good to +/−45 degrees. For better results, historic values may also be utilized. It is understood that is but one illustrative example of a directional finding algorithm and numerous directional finding programs can be derived to accomplish more or less precise estimates without falling outside the scope of the present invention.

It is also noted that in the above example, only one calibration point may be needed for each antenna, max(abs (D_i(theta)). In general, the device may store more or less information on the calibration depending on the accuracy of the desired AoA.

Figure 5:
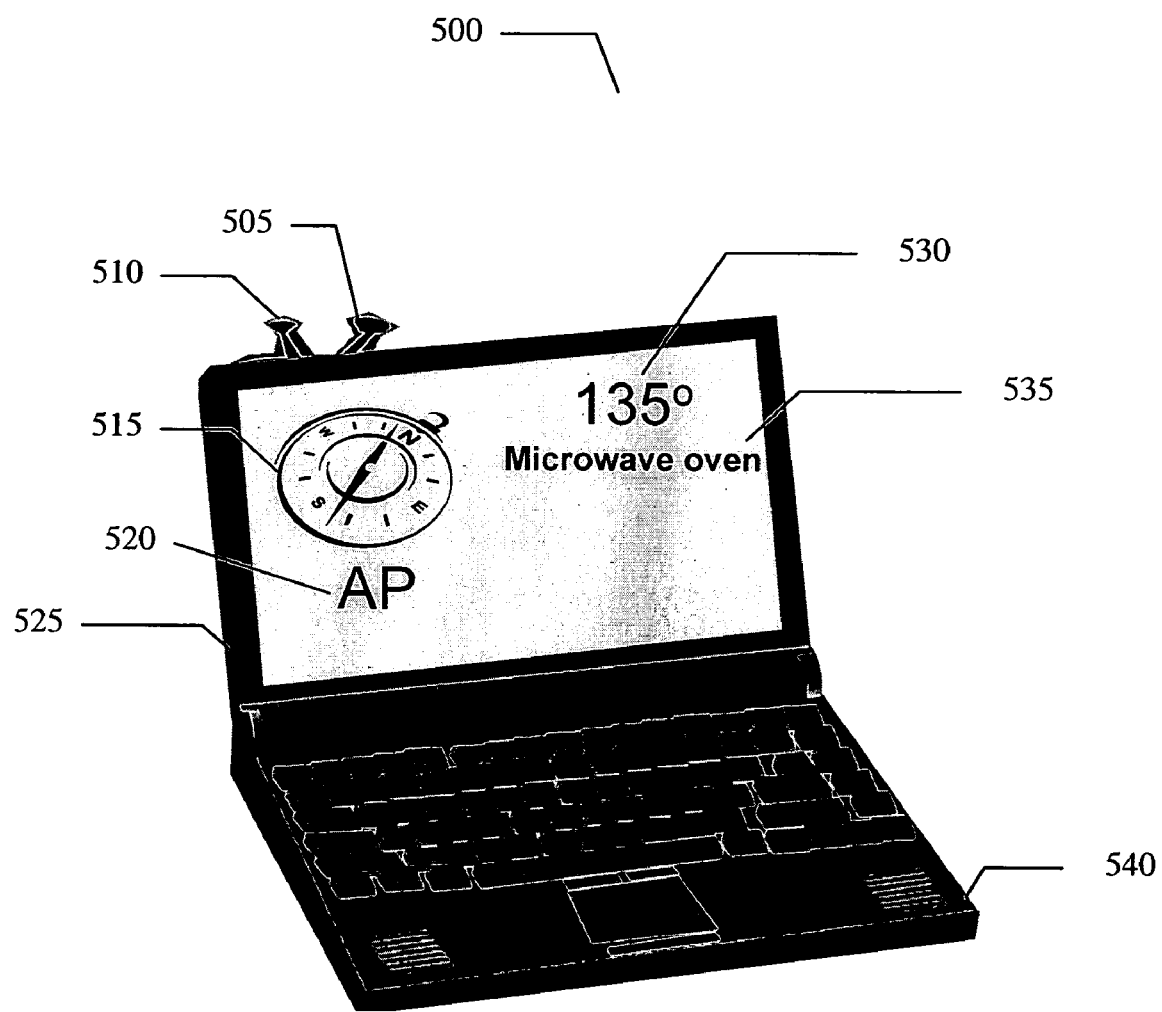
FIG. 5 depicts the display of the directional information in one embodiment of the present invention.

FIG. 5 shows generally at 500 one embodiment of the apparatus of the present invention which includes a laptop computer 540 with screen 525 that has antennas 510 and 505 built in. In this embodiment of the present invention, interference may be detected (and displayed at 535) from a microwave oven. The relative position of the direction of the interference is displayed at 530 to be 135°. This AoA information may allow the operator to take further action, such as moving the computer 540 away from the interference or closer to the AP. In this embodiment, the position of the AP 520 may be shown on compass 515 which may be displayed on screen 525 of laptop computer 540. The display may be numerical or graphical. Further, the compass display may take a convenient convention such as: North may be behind the display; South may be towards the user; East may be right; and West may be to the left. It is anticipated that a wide variety of displays may be used to provide the interference AoA and access point position information. For example, a discrete number of LEDs can be utilized to show the directions of the RF source.

Figure 6:
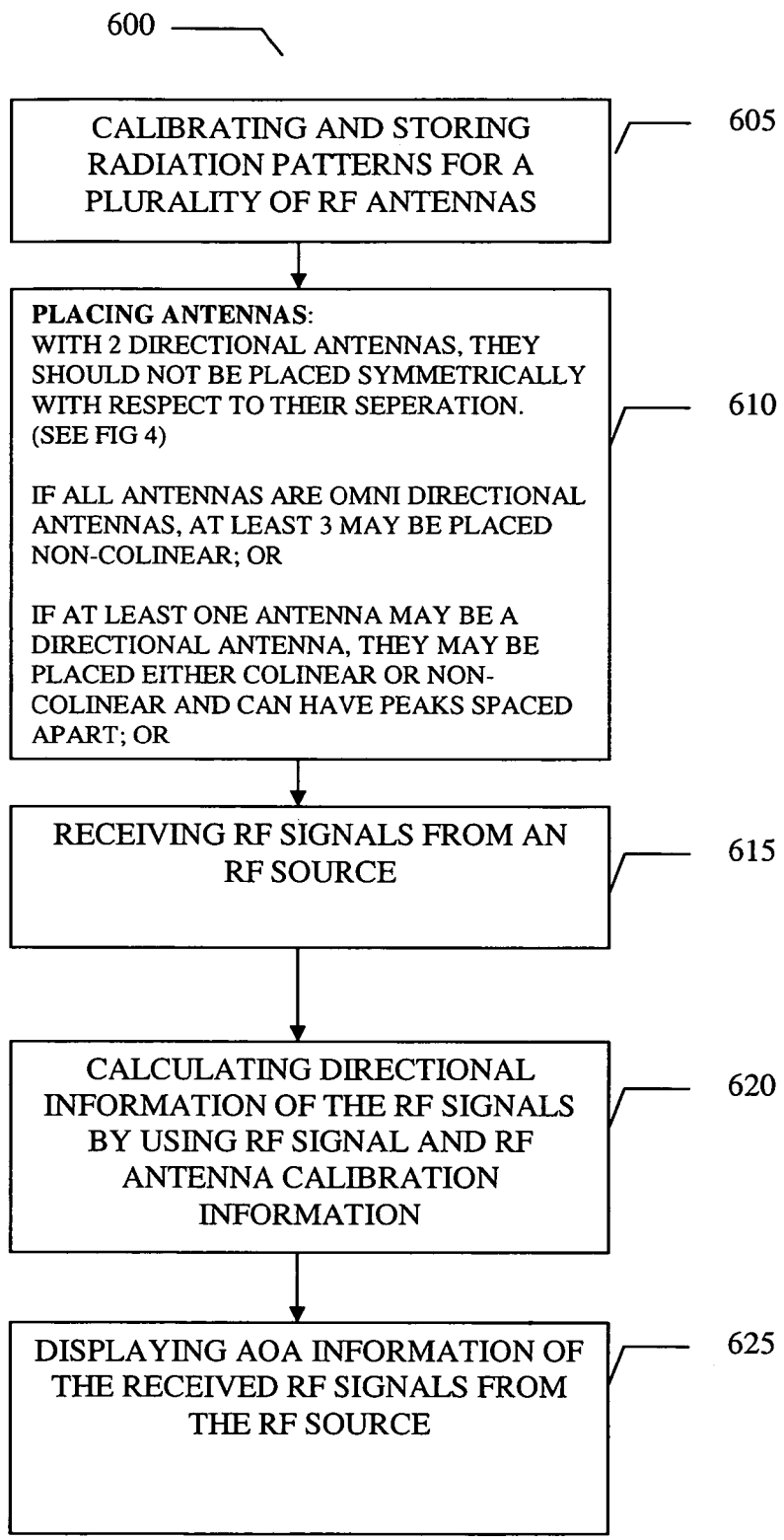
FIG. 6 is a flowchart of one method of RF signal direction finding of one embodiment of the present invention.

Turning now to FIG. 6, at 600 is generally illustrated a flowchart of one method of one embodiment of the present invention. At 605 the radiation pattern for each antenna of the plurality of antennas may be calibrated and stored for use by the directional finding program. To determine the AoA without ambiguity, it is important to place the antennas appropriately as described above with reference to FIG. 3. At 610 the placement of the antennas provides that with 2 directional antennas, they should not be placed symmetrically with respect to their seperation or if all antennas are omni directional antennas, at least 3 may be placed non-colinear; or if at least one antenna is a directional antenna, they may be placed either colinear or non-colinear and can have peaks spaced apart.

Following the calibration and placement of the antennas, RF signals may be received from an RF source at 615. An RF source may be either spurious, such as a microwave oven, or non spurious. Next, at 620, a program calculates AoA information by using the received RF signal information and the antenna calibration information. Finally, the AoA information of the received RF signals from the RF source may be displayed at 625.

Although the preferred embodiment of the present invention herein describes 802.11 wireless local area network (WLAN) protocols, it is anticipated other protocols such as wireless wide area network (WAN), or local area network (LAN) protocols including all IEEE 802.11(x) standards, Bluetooth™, etc. may apply the same technique. (Bluetooth is a registered trademark of the Bluetooth Special Interest Group). Furthermore, it should be understood that the scope of the present invention is not limited by the types of, the number of, or the frequency of the communication protocols that may be used.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. An apparatus comprising:
   a plurality of RF antennas, said plurality of RF antennas having a calibrated radiation pattern; and
   a calculation circuit using a directional finding program which receives RF signal information from said plurality of RF antennas and RF antenna calibrated radiation pattern information and calculates the direction from which said RF signals emanate relative to said apparatus, wherein said direction finding program is Max(abs(S_i)/max(abs(D_i(theta))), where D_i is the antenna radiation pattern at a given angle theta and S is the input signal information with i representing the number of antennas.

2. The apparatus of claim 1, wherein said plurality of RF antennas are 3 or more non-colinear omni directional antennas.

3. The apparatus of claim 1, wherein said plurality of RF antennas are 3 or more directional antennas.

4. The apparatus of claim 1, wherein said plurality of RF antennas are 2 directional antennas with asymmetric patterns with respect to the separation between the phase center of said 2 directional antennas.

5. The apparatus of claim 1, wherein said plurality of RF antennas are 3 or more collinear antennas with asymmetric radiation patterns.

6. The apparatus of claim 1, wherein said calibrated radiation pattern associated with each of said plurality of RF antennas is measured to take into account a predetermined usage model.

7. apparatus of claim 6, wherein said usage model is selected from the group consisting of: a clam shell laptop computer, a PDA or a tablet.

8. The apparatus of claim 1, wherein said directional finding program can receive input (S_i) sequentially or in parallel.

9. The apparatus of claim 3, wherein said 3 or more directional antennas are 3 or more directional antennas with peaks spaced apart.

10. The apparatus of claim 1, wherein said direction from which said RF signals emanate relative to said apparatus is the Angle of Arrival (AoA) information.

11. The apparatus of claim 1, further comprising a display for displaying said direction from which said RF signals emanate relative to said apparatus.

12. A method capable of determining radio wave directional information relative to an apparatus, comprising:
   calibrating a radiation pattern for a plurality of RF antennas associated with said apparatus, said antennas capable of receiving RF signals; and
   using a calculation circuit to calculate directional information of said RF signals, said calculation performed by a program that uses said RF signal information from said plurality of RF antennas and said RF antenna calibrated radiation pattern information, wherein said direction finding program is Max(abs(S_i)/max(abs (D_i(theta))), where D_i is the antenna radiation pattern at a given angle theta and S is the input signal information and i representing the number of antennas.

13. The method of claim 12, wherein said plurality of RF antennas are 3 or more non-colinear omni directional antennas.

14. The method of claim 12, wherein said plurality of RF antennas are 3 or more directional antennas.

15. The method of claim 12, wherein said 3 or more directional antennas are 3 or more directional antennas with peaks spaced apart.

16. The method of claim 12, wherein said plurality of RF antennas are 3 or more collinear antennas with asymmetric radiation patterns.

17. The method of claim 12, wherein said calibrated radiation pattern associated with each of said plurality of RF antennas is calculated to take into account a predetermined usage model.

18. The method of claim 17, wherein said usage model is a clam shell laptop computer PDA or tablet.

19. The method of claim 12, wherein said directional finding program can receive input (S_i) sequentially or in parallel.

20. The method of claim 12, wherein said plurality of RF antennas are 2 directional antennas with an asymmetric pattern with respect to the separation between the phase center of said directional antennas.

21. The method of claim 12, further comprising displaying said direction from which said RF signals emanate relative to said apparatus.

22. A system comprising:
a wireless device within said system including a computation circuit with a directional finding program;
at least two RF antennas associated with said wireless device and capable of receiving RF signals; and
said computation circuit with a directional finding program determines an angle of arrival of said RF signals relative to said wireless device, and wherein said direction finding program is Max(abs(S_i)/max(abs(D_i (theta))), where D_i is the antenna radiation pattern at a given angle theta and S is the input signal information with i representing the number of antennas.

23. The system of claim 22, wherein each of said at least two RF antennas have a calibrated radiation pattern and said directional finding program uses said antenna calibrated radiation pattern information and received RF signal information to determine said angle of arrival of said RF signals relative to said wireless device.

24. The system of claim 22, wherein said wireless device is a WLAN equipped personal computer.

25. The system of claim 22, wherein said at least two RF antennas are non-colinear omni directional antennas.

26. The system of claim 22, wherein said at least two RF antennas are at least two directional antennas.

27. The system of claim 25, wherein said at least two directional antennas are at least two directional antennas with peaks spaced apart.

28. The system of claim 22, wherein said directional finding program can receive input (S_i) sequentially or in parallel.

29. The system of claim 22, further comprising a display for displaying said angle of arrival of said RF signals relative to said wireless device.

* * * * *